United States Patent

Aziz et al.

[11] Patent Number: 6,130,629
[45] Date of Patent: Oct. 10, 2000

[54] RATE 24/25 (0,9) CODE METHOD AND SYSTEM FOR PRML RECORDING CHANNELS

[75] Inventors: Pervez M. Aziz, South Whitehall; Patrick W. Kempsey, Catasauqua; Srinivasan Surendran, Whitehall, all of Pa.

[73] Assignee: Lucent Technologies Inc., Murray Hill, N.J.

[21] Appl. No.: 09/205,319

[22] Filed: Dec. 4, 1998

Related U.S. Application Data

[63] Continuation-in-part of application No. 09/059,061, Apr. 13, 1998.

[51] Int. Cl.[7] .................................................. H03M 7/00
[52] U.S. Cl. .............................................. 341/50; 341/59
[58] Field of Search ........................................ 341/50, 59

[56] References Cited

U.S. PATENT DOCUMENTS

| | | |
|---|---|---|
| 4,486,739 | 12/1984 | Franaszek et al. . |
| 4,707,681 | 11/1987 | Eggenberger et al. . |
| 5,260,703 | 11/1993 | Nguyen et al. . |
| 5,537,112 | 7/1996 | Tsang . |
| 5,604,497 | 2/1997 | Sonntag . |
| 5,635,933 | 6/1997 | Fitzpatrick et al. ................. 341/58 |
| 5,668,545 | 9/1997 | Chen .................................. 341/50 |
| 6,018,304 | 1/2000 | Bessios .............................. 341/59 |

*Primary Examiner*—Trong Q. Phan
*Attorney, Agent, or Firm*—Ian M. Hughes; Steve Mendelsohn

[57] ABSTRACT

A system and method employing a rate 24/25 (0,9) code constructed in accordance with a data byte interleaved with a rate 16/17 (0,5) codeword formed from two data bytes limits the number of consecutive zeros seen by a channel to nine. The 16/17 (0,5) codeword is formed from the two data bytes in accordance with a set of pivot bits and a set of corrections for predefined code violations. The additional data byte is interleaved into the 16/17 (0,5) codeword by splitting the byte into a pair of portions and inserting the portions into the 16/17 (0,5) codeword at locations adjacent to predefined ones of the pivot bits. The rate 24/25 (0,9) code is suitable for magnetic or similar recording media and may be employed in partial response maximum likelihood read channels. A feature of the constructed code is a high transition density which allows for more frequent timing and gain control updates, which results in lower required channel input signal to noise ratio for a given channel performance.

18 Claims, 7 Drawing Sheets

RATE 24/25 (0,9) CODE METHOD AND SYSTEM FOR PRML RECORDING CHANNELS

CROSS-REFERENCE TO RELATED APPLICATIONS

This is a continuation-in-part of copending application Ser. No. 09/059,061, filed on Apr. 13, 1998, the teachings of which are incorporated herein by reference.

BACKGROUND OF THE INVENTION

1. Field of the Invention

The present invention relates in general to codes for modulation encoding and decoding systems, and, more particularly, to a system employing a 24/25 (0,9) modulation code.

2. Description of the Related Art

Many conventional magnetic recording systems include partial response or peak-detection magnetic recording channels for data detection. Data detection within a digital communication channel is generally based on periodically sampling the amplitude of the transmitted signal. Enhancements to encoding techniques extend the performance of partial response and peak detection systems by allowing more transitions without degrading data detection.

Modulation codes may be employed to achieve high transition densities within magnetic recording systems. High transition densities allow more frequent timing and gain control updates, which, in turn, result in a lower required channel input signal to noise ratio (SNR) for a given magnetic recording channel performance. In a typical system, data are first encoded with an error correction code, and then encoded with a modulation code using a modulation encoder and precoder before the encoded data are written to a recording channel of a magnetic recording media, such as disk or tape. When the magnetic recording channel is read from the media by a head, an equalizer equalizes the readback signal to a target partial response (PR). The equalized signal may then be applied to a maximum likelihood (ML) sequence detector, also known as a Viterbi detector, to reconstruct the modulation-coded encoded data signal. The reconstructed signal may then be subject to inverse coding operations, such as unprecoding, modulation decoding, and then error correction decoding.

The modulation encoder and precoder are employed to provide that timing recovery circuitry and gain control circuitry as used with the equalizer receive non-zero or other active information frequently, without degrading the efficacy of the ML sequence detector to correctly detect the sequence for a given PR. The modulation encoder receives a group of M bits and encodes the M bits as a group of N channel bits such that the group of N channel bits satisfy a given constraint. Several properties are desirable for a modulation code for ease of implementation of a modulation encoder. First, the modulation code should be a block code where no a priori knowledge of bits or other bit group information outside the given group of M bits and N bits is required. Second, the code should have a high rate or coding density of M/N, and third, the code should have good constraints. Fourth, the code should be efficiently implemented in a logic circuit, and fifth, the code should not affect the efficacy of the ML sequence detector.

Run length limited (RLL) block codes may be typically used for the modulation code, and these RLL block codes may be characterized by the coding density of M/N, where M is an integer, which is usually either a multiple or submultiple of the number 8, and N is a larger integer than M. M data bits are coded into N symbols, or channel bits, with the constraint that M be a multiple or submultiple of 8 arising from the outer, error correcting code working on a byte by byte basis. Decoding a block of channel bits which contains one or more errors contaminates an entire block; accordingly, alignment of block boundaries with byte boundaries reduces the number of contaminated bytes.

RLL block codes are also characterized by run length constraints, labeled as (d,G/I), where d is the minimum number of zeros between ones, G is the maximum number of zeros, between ones, and I is the maximum number of zeros between ones in odd/even substrings. For high density codes, d=0, while the G constraint ensures sufficient transitions for the timing recovery and gain control functions. Depending on the PR, the I constraint, and/or the G constraint, avoids quasi-catastrophic sequences that may reduce the effectiveness of ML sequence detectors.

The I constraint is generally only useful for some PR channels, an example of which is a channel with a partial response transfer function of the form $1-D^2$, also known as a PR4 channel. Other PR channels may be used; for example; an EPR4 channel, which is characterized by the channel's partial response transfer function, or polynomial, being $1+D-D^2-D^3$, may be used. For the PR4 channel, the G constraint itself, in conjunction with a $1/(1 \oplus D^2)$ precoder, provides sufficient timing and/or gain control information while limiting the quasi-catastrophic sequences. PRML magnetic read channels of the prior art have employed a popular 8/9 code with constraints (0,4,4), such as is described in U.S. Pat. No. 4,707,681, entitled METHOD AND APPARATUS FOR IMPLEMENTING OPTIMUM PRML CODES, to Eggenberger et al., and which is incorporated herein by reference. This lower rate code has been extended to a higher rate of 16/17, disclosed in U.S. Pat. No. 5,604,497, entitled APPARATUS AND METHOD FOR INCREASING DENSITY OF RUN LENGTH LIMITED BLOCK CODES WITHOUT INCREASING ERROR PROPAGATION, to Jeffrey L. Sonntag, and which is incorporated herein by reference. These types of codes yield a high rate but at the expense of degrading the G and I constraints, which become, for example, (0,G=12,I=8). Further, rate 16/17 codes have been constructed which are not derived from a lower rate 8/9 code, and this construction is described in, for example, U.S. Pat. No. 5,635,933, entitled RATE 16/17 (D=0,G=6/I=7) MODULATION CODE FOR A MAGNETIC RECORDING CHANNEL, to Fitzpatrick et al., which is incorporated herein by reference.

SUMMARY OF THE INVENTION

The present invention relates to encoding or decoding employing a 24/25 (0,9) codeword formed from three bytes of binary data. An exemplary embodiment encodes by storing the first and second bytes as first and second bit strings and the third byte as first and second nibbles. In accordance with a 16/17 (0,5) code construction, the encoder determines whether each of the first and second bit strings contains at least one code violation, each code violation corresponding to a given bit sequence, and identifies a type and a position of the code violation. A pivot bit is inserted between the first and second strings. The first and second strings with the pivot bit inserted therebetween is encoded into a 16/17 (0,5) codeword based on the type and the position of each code violation identified by the processor. Encoding into a 16/17(0,5) word corrects, as necessary, any code violation in the first and second bit strings by 1) setting the inserted pivot bit to a first value, 2) defining values for a bit in each of the first and second bit strings as additional pivot bits, the additional pivot bits identifying the type and the position of each code violation, 3) preserving values for bits not included in the given bit sequence corresponding to the code violation, and 4) assigning values, as necessary, for one or more bits of the given bit sequence. The 24/25 (0,9) codeword is produced by inserting the first and second nibbles of the third byte adjacent to the additional pivot bits of the first and second bit strings in the 16/17 (0,5) codeword, respectively.

Another exemplary embodiment decodes by dividing the 24/25 (0,9) codeword into first and second nibbles and a 16/17 (0,5) codeword based on a set of pivot bits of the 24/25 (0,9) codeword, the first and second nibbles forming the third byte. The 16/17 (0,5) codeword is stored as N symbols; and preserved bits are provided from the N symbols of the 16/17 (0,5) codeword based on the set of pivot bits. Whether the first and second bytes include a code violation is determined from the set of pivot bits that identify a type and a position of any code violation in the first and second bytes. Each code violation corresponds to a given bit sequence within the first and second bytes. The first and second bytes are formed from the preserved bits and the given bit sequence of each code violation in accordance with the set of pivot bits, wherein any code violation in the first and second bytes is reconstructed as the given bit sequence having the type and at the position as defined by the set of pivot bits. The preserved bits are assigned to respective locations in the first and second bytes in accordance with the set of pivot bits.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Magnetic Recording System

The present invention relates to a system and method employing a rate 24/25 (0,9) code constructed in accordance with a set of pivot bits and a set of corrections for predefined code violations which, for the exemplary embodiments as described below, limits the number of consecutive zeros seen by a channel to nine, thereby resulting in a G constraint of nine. The constructed code includes a high transition density which allows for more frequent timing and gain control updates, which results in lower required channel input signal to noise ratio for a given channel performance.

Figure 1:
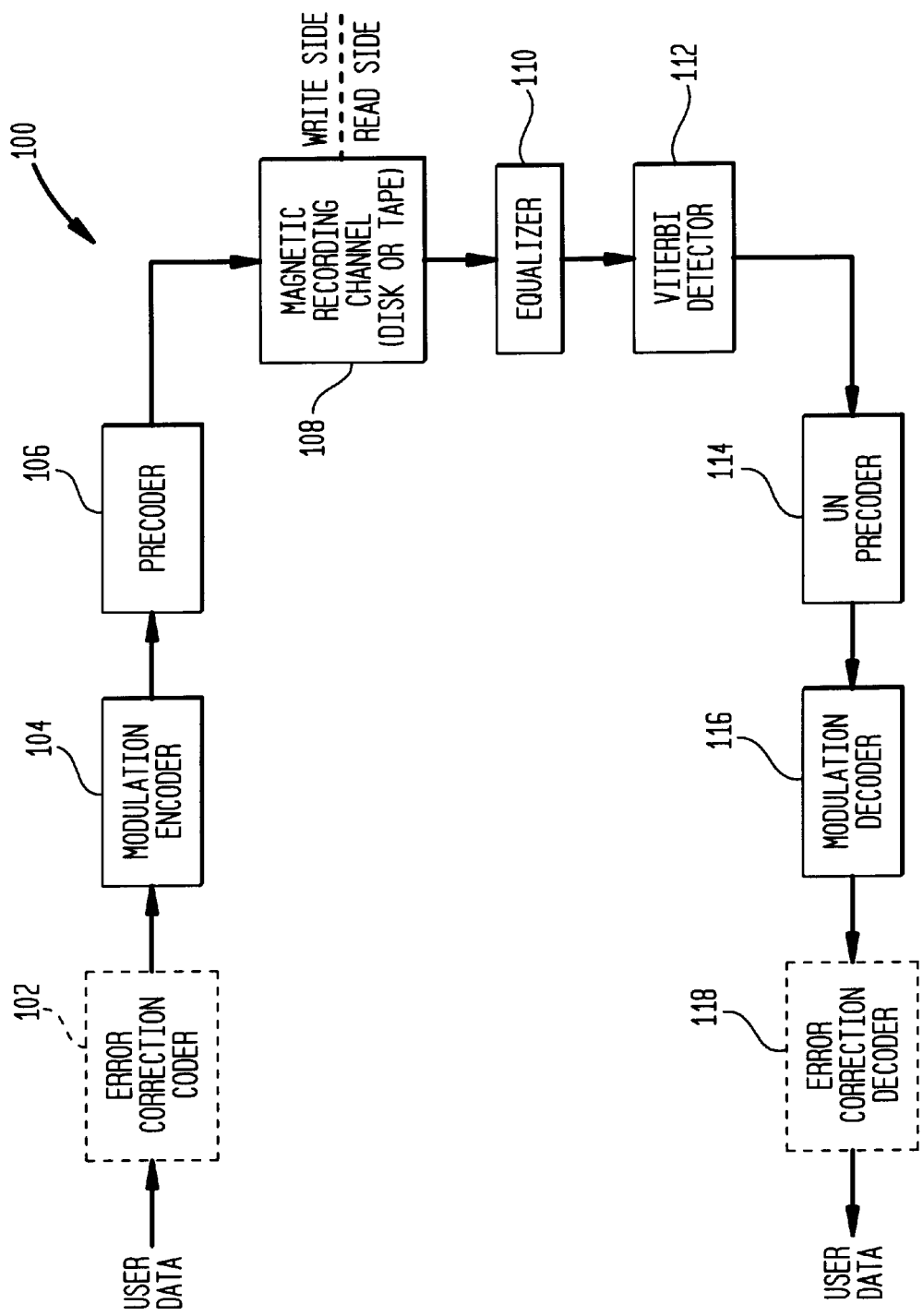
FIG. 1 is a block diagram showing a system having a modulation encoder and a modulation decoder employing a rate 24/25 (0,9) code in accordance with an exemplary embodiment of the present invention.

FIG. 1 is a block diagram showing a modulation encoder and a modulation decoder system 100 employing a rate 24/25 (0,9) code in accordance with an exemplary embodiment of the present invention. As shown in FIG. 1, the system 100 includes an encoding section having an optional error correction coder 102, modulation encoder 104, and precoder 106. The system 100 also includes a decoding section including an equalizer 110, sequence detector 112, unprecoder 114, modulation decoder 116 and optional error correction decoder 118. Coded information from the encoding section is written to a magnetic recording channel 108, which may be magnetic disk or tape media, and the coded information is read from the magnetic recording channel 108 by the decoding section.

The modulation encoder 104 receives data as sequential bytes, with three bytes forming a dataword $A=a(1), a(2), \ldots a(24)$. Optional error correction coder 102 may receive user data and encode the user data using error correction techniques as are known in the art to provide these datawords. The modulation encoder 104 encodes the datawords as 24/25 (0,9) output codeword Z having 25 symbols, in accordance with the present invention. These output codewords are then subject to a preceding process by precoder 106. As is known in the art, the precoder 106 is used to verify that the output codewords of the modulation encoder 106 satisfy constraints of peripheral gain control and timing recovery circuits, such as an all 1's, an all 0's and/or an alternating 101010... sequence being encoded and recorded as different, predefined bit sequences. Such precoder 106 may be, for example, a precoder of the form $1/(1 \oplus D^2)$.

The output sequence of the precoder 106 is then written to the magnetic recording channel 108 using, for example, a recording head, and then read from the magnetic recording channel 108 by a device such as, for example, a read-back head. The received signal is then equalized within equalizer 110 such that the equalized signal corresponds to the partial response transfer function, (e.g., EPR4 transfer function) which also represents a output channel response polynomial corresponding to the received sequence of levels. The received sequence is provided to the sequence detector 112. Sequence detector 112, which may be a Viterbi detector, determines a sequence of symbols in a state trellis structure that is closest to the received sequence of levels according to a predefined metric. The sequence detector 112 then provides the determined sequence of symbols as the output symbol sequence.

The unprecoder 114 receives the output symbol sequences and reverses the preceding operation of the precoder 106. Unprecoder 114 then provides a sequence of output codewords (Z's) to the modulation decoder 116. Modulation decoder 116 decodes each codeword Z of rate 24/25 (0,9) in accordance with the present invention to provide a sequence of three-byte datawords. Optional error correction decoder 118 may then be used to perform error correction processing to provide reconstructed user data.

Code Construction

The modulation encoder 104 and modulation decoder 116 each encode and decode, respectively, in accordance with the characteristics of the 24/25 (0,9) code construction. The 24/25 (0,9) code construction is based on encoding of three bytes of information, defined as the dataword A. The 24/25 (0,9) code construction is based on forming the codeword Z by first forming a codeword ξ in accordance with a 16/17 (0,5) code construction from two bytes of the dataword A, and then interleaving the third remaining byte into the 16/17 (0,5) codeword ξ. Although the following description of the preferred embodiment refers to three bytes of user data, the present invention is not so limited to consecutive bits within the bytes of the user data. For example, the bits of the user data may be rearranged, or interleaved, so as to remove naturally occurring periodicity within the data (e.g., repeating sign bits every eighth or sixteenth bit position of the sequence). Consequently, as used herein, the term "byte" simply refers to a group of eight bits from an input sequence of user data.

Code construction of the 16/17 (0,5) codeword is a basis for the 24/25 (0,9) code construction, and may be summarized as follows. A 16/17 (0,5) block encoder encodes 16 bits of the input dataword A consisting of elements a(1), . . . , a(16) (herein defined as A'). The input dataword A' is then split into two bit strings: an 8 bit left bit string and an 8 bit right string consisting of a(1), . . . , a(8) and a(9), . . . , a(16), respectively. Next, a temporary 17 bit output codeword X consisting of elements x(1), . . . , x(17) is formed. The middle bit of X, x(9), is defined as a pivot bit, pbm, and is set to logic "1". The left bit string of X, x(1), . . . , x(8) comprises the left bit string of A' while the right bit string of X, x(10), . . . , x(17) consists of the right bit string of A'. The bit string X is checked for pre-defined code violations. For a (0,5) code construction the bit string X should have no more than two consecutive zeroes at either end of the output bit string, or have no more than five consecutive zeroes within the bit string.

Code violations in codeword X are classified based on whether the violation occurs in the left bit string of X or in the right bit string of X. In addition, these code violations are further classified based on where the violation occurs in the respective string. Whether one or more or combinations of these code violations exists may be determined using combinational logic equations involving the elements of A. If there are no violations in X, the bit string X is simply assigned as the output codeword ξ.

For the case of one or more code violations, the main pivot bit pbm is set to 0 to indicate that at least one code violation occurred in X. In addition to the main pivot pbm, two other pivot bits pbl=x(8) (for the left bit string) and pbr=x(10) (for the right bit string) are defined. Different operations are performed to produce an output codeword that satisfies the run length constraint depending on whether 1) only left string violations; 2) only right string violations; or 3) both left and right string violations occurred in X.

The pivot bits pbl and pbr indicate whether only left bit string or only a right string violation has occurred. For example, in the case of a left string violation only, pbl is set to logic 0 and pbr is set to logic 1. This choice for pivot bit logic values ensures that any modifications to the left string of X do not cause any violations in the right string. Given the above code construction decoding is easily determined by examination of the various pivot bits observed in the received codeword ξ. A description of the encoding and decoding processes and combinational logic equations for implementing encoding and decoding in accordance with the 16/17 (0,5) code construction are described subsequently.

The rate 24/25 (0,9) codeword Z is then obtained by interleaving the third, and remaining, byte of dataword A with the 16/17 (0,5) codeword 4 constructed from the first two bytes of dataword A. The 24/25 (0,9) codeword Z is obtained by first splitting the remaining byte into two, 4-bit portions UL and UR that are the left and right nibbles of the uncoded byte. The portions UL and UR are then inserted between bit positions of the 16/17 (0,5) codeword ξ. Defining "L" as the 7-bit, left bit string and "R" s the 7-bit right string on either side of the pivot bits pbl, pbm, and pbr of the 16/17 (0,5) codeword ξ, the bit string <ξ> of the output 16/17 (0,5) codeword is given by <L pbl pbm pbr R>. Using these definitions, the bit string <Z> of the output 24/25 (0,9) codeword Z is defined as <L UL pbl pbm pbr UR R>.

Now the run length constraint (G) for the 24/25 (0,9) code are verified, and the G constraint for 16/17 (0,5) code determines the G constraint for the 24/25 code. The G constraints are evaluated with the "worst" bit string for the third byte, with UR=UL=0000. Two concatenated 24/25 (0,9) codewords <$Z_1$> and <$Z_2$> are represented as: <L UL pbl pbm pbr UR R ><L UL pbl pbm pbr UR R>. Since both <$Z_1$> and <$Z_2$> satisfy the (0,5) constraint, then the string R of <$Z_1$> concatenated with the string L of <$Z_2$> by definition of the 16/17 (0,5) code construction also satisfies the (0,5) constraint.

If the 16 bit string for the 16/17 (0,5) code portion $Z_1$ does not violate the run length constraint, then the 16/17 (0,5) codeword has pbm=1, implying independence between right and left substrings R and L of the 24/25 (0,9) codeword $Z_1$. For this first case, with pbr=1 and the nibble UR has four consecutive zero bit values, since R satisfies the (0,5) constraint there can be a maximum of 5 zeroes after UR. Consequently, with pbr=1, the run length constraint G is 4 (for UR)+5 (for R)=9. For this first case with pbr=0 and the nibble UR having all zero bit values, a further characteristic of the 16/17 (0,5) code construction is important. Since R satisfies the (0,5) constraints when pbr=0, there is a maximum of 4 consecutive zeroes in the bit string R after the nibble UR. Hence the run length constraint is 1 (for pbr)+4 (for UR)+4 (for R)=9. Due to symmetry, the verification result is similar for the left substring of $Z_1$ for the first case.

When a code violation occurs in the 16 bit string of the 16/17 (0,5) codeword ξ, several cases are examined. For these cases, the 16/17 (0,5) codeword ξ, of codeword $Z_1$ has pbm=0, but either pbr or pbl is set to 1, or (pbl, pbr)=(0,1), (1,0), or (1,1). This allows for independence between the right and left substrings of 24/25 (0,9) codeword $Z_1$. For the second case of (pbl, pbr)=(0,1), there is a bit string code violation in R and no bit string violation in L. Also, for the "worst" case, the nibble UR has four consecutive zero bit values. Since R satisfies the (0,5) constraint and pbr=1, R may have a maximum of 5 consecutive zero bit values after UR; hence the run length constraint is 4+5=9. In the third case of (pbl, pbr)=(1,0) similar results for verification of G constraints are achieved due to symmetry. For the fourth case of (pbl, pbr)=(1,1) the results for the second and third cases hold (from the independence of the left and right strings of $Z_1$) and the run length constraint is 9.

Given the 24/25 (0,9) encoding procedure, block decoding is relatively straightforward since the interleaved, uncoded byte is simply removed and the remaining 16/17 (0,5) codeword is then decoded using the values of the various pivot bits in the remaining codeword. The values of the pivot bits pbl, pbm, and pbr determine the various operations used to recover the remaining two bytes of the original dataword A from the 16/17 (0,5) codeword ε.

Encoding and combinational logic equations for implementing encoding in accordance with the 16/17 (0,5) code construction are now described. Decoding and combinational logic equations for implementing decoding are described subsequently with respect to the 24/25 (0,9) modulation decoder 116 of FIGS. 5 and 6. The two bytes of the dataword A are first split into two bit-strings of element values, such as, for example, a left string including dataword A' element values a(1) through a(8) and a right string including dataword A' element values a(9) through a(16). Next, a temporary 17 bit output codeword X=x(1), x(2), . .

x(17) is formed from the left and right strings by inserting a pivot bit, pbm, between the left and right strings. The pivot bit, pbm, corresponding to the value of element x(9) of X is initially set to, for example, a "1", forming the temporary codeword X shown in Table 1:

TABLE 1

| x(1) | x(2) | x(3) | x(4) | x(5) | x(6) | x(7) | x(8) | x(9) | x(10) | x(11) | x(12) | x(13) | x(14) | x(15) | x(16) | x(17) |
|------|------|------|------|------|------|------|------|------|-------|-------|-------|-------|-------|-------|-------|-------|
| a(1) | a(2) | a(3) | a(4) | a(5) | a(6) | a(7) | a(8) | 1    | a(9)  | a(10) | a(11) | a(12) | a(13) | a(14) | a(15) | a(16) |

After the temporary codeword X is formed, a next step of the 16/17 (0,5) code construction defines a set of code violations. For example, for a (0,5) code there may not be more than two zeros at either the beginning or end positions of the bit string of the output codeword 4, and/or there may be no more than five consecutive zeros within the bit string of the output codeword $\xi$. Code violations may first be classified by whether the code violation occurs within the left bit string or within the right bit string of temporary codeword X, and these left and right string code violation classifications are identified by the labels "li" and "ri", i=1,2,3, respectively. Second, the code violations may be classified as being either a type i=1, type i=2, or type i=3 violation based on the position of the code violation within the left or right string of temporary codeword X. Therefore, these classifications of code violations are as summarized in Table 2:

TABLE 2

| Violation Name | Violation |
|---|---|
| l1 | x(1), x(2) and x(3) = 0 (or equivalently, a(1), a(2) and a(3) = 0) |
| l2 | x(2), x(3), x(4), x(5), x(6) and x(7) = 0 (or equivalently, a(2), . . . a(7) = 0) |
| l3 | x(3), x(4), x(5), x(6) x(7) and x(8) = 0 (or equivalently, a(3), . . . a(8) = 0) |
| r1 | x(15), x(16) and x(17) = 0 (or equivalently, a(14), a(15) and a(16) = 0) |
| r2 | x(11), x(12), x(13) x(14), x(15) and x(16) = 0 (or equivalently, a(10), . . . a(15) = 0) |
| r3 | x(10), x(11), x(12), x(13) x(14) and x(15) = 0 (or equivalently, a(9), . . . a(14) = 0) |

If none of the code violations as given in Table 2 occur in the temporary codeword X, then the element values of X are respectively assigned to the output element values of the output codeword $\xi$=z(1), z(2) . . . , z(17). If, however, one or more of the code violations as given in Table 2 occur, the encoding method corrects each code violation in the string X. When a violation is identified, the pivot bit pbm (of x(9)) is set to 0 to allow a decoder in accordance with the present invention to identify a codeword $\xi$, and so codeword Z, that contains a dataword A' having at least one violation.

Three violation cases are possible: a first case in which violations occur only in the left string, a second case in which violations occur only in the right string, and a third case in which violations occur in both the left and right strings. For each of the three cases a different operation is performed to correct the code violations. To identify these cases, additional pivot bits are defined as pbl=x(8), pbr=x(10), pb1a=x(3), pb2a=x:(15).

For the first case in which violations only occur in the left string, one or more violations of type l1, l2 and l3 may occur. As a first step, the pivot bit pbl is set to "0" and the pivot bit pbr is set to "1" to allow a decoder in accordance with the present invention to identify a codeword which contains a dataword A' having left string-only violations of the first case. No further modifications are made to the right string for this first case; consequently, modifications to the element values of the left string may not cause code violations to subsequently occur within the right string since pbr is set to 1. Since the pivot bits pbl and pbr are employed at the position of bits a(8) and a(9), respectively, of the input dataword A', the values of a(8) and a(9) are desirably preserved and stored in the left string.

Once the code violations are identified and pivot bits set for the first case, as a second step an encoder process corrects these violations. Since a violation at a position in the left string corresponds to zero values at that position based on the definitions of Table 2 for the exemplary embodiment, the bits corresponding to the element values for each violation at the corresponding position(s) may be set to one or zero, depending on the encoder's decision process. The remaining bits which are not known to be zero values are then desirably preserved. However, the positions of these code violations and the encoder's decision process are also known to the decoder in order to decode the codeword $\xi$. Table 3 gives a list of possible violations within the left string, and the corresponding bit element values that are desirably preserved.

TABLE 3

| Violation | Zero Bits | Bits to Preserve |
|---|---|---|
| l1 only | a(1), a(2) and a(3) = 0 | a(4), a(5), a(6), a(7), a(8) and a(9) |
| l2 only | a(2), a(3), a(4), a(5), a(6) and a(7) = 0 | a(1), a(8) and a(9) |
| l3 only | a(3), a(4), a(5), a(6), a(7) and a(8) = 0 | a(1), a(2) and a(9) |
| l1, l2 | a(1), a(2), a(3), a(4), a(5), a(6) and a(7) = 0 | a(8) and a(9) |
| l1, l3 | not used (same as l1, l2 and l3 case) | |
| l2, l3 | a(2), a(3), a(4), a(5), a(6), a(7), a(8) and a(9) = 0 | a(1) and a(9) |
| l1, l2 and l3 | a(1), a(2), a(3), a(4), a(5), a(6), a(7) and a(8) = 0 | a(9) |

As shown in Table 3, if a(1), a(2) a(8) and a(9) are preserved, the bit preservation requirement for all combinations of left string-only violations is met except when only an l1 violation occurs. Therefore, an exemplary embodiment of the present invention employs two different codewords for $\xi$, each corresponding to a respective one of these two versions of the first case of left string-only violations. The element z(3) of codeword $\xi$, which is the pivot bit pb1a, may be employed to distinguish between the two versions. In the exemplary embodiment, setting the pivot bit pb1a to a "1" indicates an l1-only code violation, and setting the pivot bit pb1a to "0" indicates all other left string-only violations. An exemplary codeword $\xi$ is given in Table 4 for a left string-only, l1-only code violation which satisfies the conditions of Table 3, while Table 5 provides the exemplary codeword $\xi$ for all other left string-only violations except the l1-only code violation:

TABLE 4

| z(1) | z(2) | z(3) | z(4) | z(5) | z(6) | z(7) | z(8) | z(9) | z(10) | z(11) | z(12) | z(13) | z(14) | z(15) | z(16) | z(17) |
|---|---|---|---|---|---|---|---|---|---|---|---|---|---|---|---|---|
| a(8) | a(9) | 1 | a(4) | a(5) | a(6) | a(7) | 0 | 0 | 1 | a(10) | a(11) | a(12) | a(13) | a(14) | a(15) | a(16) |

TABLE 5

| z(1) | z(2) | z(3) | z(4) | z(5) | z(6) | z(7) | z(8) | z(9) | z(10) | z(11) | z(12) | z(13) | z(14) | z(15) | z(16) | z(17) |
|---|---|---|---|---|---|---|---|---|---|---|---|---|---|---|---|---|
| 1 | a(1) | 0 | a(2) | a(8) | a(9) | 1 | 0 | 0 | 1 | a(10) | a(11) | a(12) | a(13) | a(14) | a(15) | a(16) |

As shown in Tables 4 and 5, the codeword ξ element z(3)=pb1a=1 corrects the left string-only, l1-only code violation, while z(3)=pb1a=0 and z(1)=z(7)=1 corrects all other left string-only violations.

For the second case of right string-only violations, a table similar to that of Table 3, given below as Table 6, may be constructed. For this second case, the pivot bits pbr and pb2a are employed and yield the codewords ξ given in Table 7, for the right string-only, r1-only code violation version, and in and Table 8, for all other right string-only violation versions except the r1-only code violation.

TABLE 6

| Violation | Zero Bits | Bits to Preserve |
|---|---|---|
| r1 only | a(14), a(15) and a(16) = 0 | a(8), a(9), a(10), a(11), a(12) and a(13) |
| r2 only | a(10), a(11), a(12), a(13), a(14) and a(15) = 0 | a(8), a(9) and a(16) |
| r3 only | a(9), a(10), a(11), a(12), a(13) and a(14) = 0 | a(8), a(15) and a(16) |
| r1, r2 | a(10), a(11), a(12), a(13), a(14), a(15) and a(16) = 0 | a(8) and a(9) |
| r1, r3 | not used (same as r1, r2 and r3 case) | |
| r2, r3 | a(9), a(10), a(11), a(12), a(13), a(14) and a(15) = 0 | a(8) and a(16) |
| r1, r2 and r3 | a(9), a(10), a(11), a(12), a(13), a(14), a(15) and a(16) = 0 | a(8) |

For the third case in which violations occur in both the left string and in the right string, the output codeword ξ may be formed in manner employing the left-only and right-only violation corrections as given in Tables 2–8. Consequently, the codewords ξ for the versions of the remaining third case for the exemplary embodiment of the present invention are as given in Tables 9–12.

Table 9 shows the output codeword ξ for an l1-only left string violation and an r1-only right string violation, and the pivot bits for this codeword are given as pbm=0, pbl=1, pbr=1, pb1a=1 and pb2a=1. Table 10 shows the output codeword ξ for an r1-only right string code violation and all combinations of left string code violations except the l1-only code violation, and the pivot bits for this codeword are pbm=0, pbl=1, pbr=1, pb1a=0 and pb2a=1. Table 11 shows the output codeword ξ for an l1-only left string violation and all combinations of right string violations except an r1-only code violation, and the pivot bits for this codeword are pbm=0, pbl=1, pbr=1, pb1a=1 and pb2a=0. Table 12 shows the output codeword ε for all left string violations except an l1-only code violation and all right string violations except an r1-only code violation, and the pivot bits for this codeword are pbm=0, pbl=1, pbr=1, pb1a=0 and pb2a=0.

TABLE 7

| z(1) | z(2) | z(3) | z(4) | z(5) | z(6) | z(7) | z(8) | z(9) | z(10) | z(11) | z(12) | z(13) | z(14) | z(15) | z(16) | z(17) |
|---|---|---|---|---|---|---|---|---|---|---|---|---|---|---|---|---|
| a(1) | a(2) | a(3) | a(4) | a(5) | a(6) | a(7) | 1 | 0 | 0 | a(10) | a(11) | a(12) | a(13) | 1 | a(8) | a(9) |

TABLE 8

| z(1) | z(2) | z(3) | z(4) | z(5) | z(6) | z(7) | z(8) | z(9) | z(10) | z(11) | z(12) | z(13) | z(14) | z(15) | z(16) | z(17) |
|---|---|---|---|---|---|---|---|---|---|---|---|---|---|---|---|---|
| a(1) | a(2) | a(3) | a(4) | a(5) | a(6) | a(7) | 1 | 0 | 0 | 1 | a(8) | a(9) | a(15) | 0 | a(16) | 1 |

TABLE 9

| z(1) | z(2) | z(3) | z(4) | z(5) | z(6) | z(7) | z(8) | z(9) | z(10) | z(12) | z(13) | z(14) | z(15) | z(16) | z(17) | z(18) |
|---|---|---|---|---|---|---|---|---|---|---|---|---|---|---|---|---|
| a(8) | a(9) | 1 | a(4) | a(5) | a(6) | a(7) | 1 | 0 | 1 | a(10) | a(11) | a(12) | a(13) | 1 | a(8) | a(9) |

TABLE 10

| z(1) | z(2) | z(3) | z(4) | z(5) | z(6) | z(7) | z(8) | z(9) | z(10) | z(11) | z(12) | z(13) | z(14) | z(15) | z(16) | z(17) |
|---|---|---|---|---|---|---|---|---|---|---|---|---|---|---|---|---|

TABLE 10-continued

| 1 | a(1) | 0 | a(2) | a(8) | a(9) | 1 | 1 | 0 | 1 | a(10) | a(11) | a(12) | a(13) | 1 | a(8) | a(9) |
|---|---|---|---|---|---|---|---|---|---|---|---|---|---|---|---|---|

TABLE 11

| z(1) | z(2) | z(3) | z(4) | z(5) | z(6) | z(7) | z(8) | z(9) | z(10) | z(11) | z(12) | z(13) | z(14) | z(15) | z(16) | z(17) |
|---|---|---|---|---|---|---|---|---|---|---|---|---|---|---|---|---|
| a(8) | a(9) | 1 | a(4) | a(5) | a(6) | a(7) | 1 | 0 | 1 | 1 | a(8) | a(9) | a(15) | 0 | a(16) | 1 |

TABLE 12

| z(1) | z(2) | z(3) | z(4) | z(5) | z(6) | z(7) | z(8) | z(9) | z(10) | z(11) | z(12) | z(13) | z(14) | z(15) | z(16) | z(17) |
|---|---|---|---|---|---|---|---|---|---|---|---|---|---|---|---|---|
| 1 | a(1) | 0 | a(2) | a(8) | a(9) | 1 | 1 | 0 | 1 | 1 | a(8) | a(9) | a(15) | 0 | a(16) | 1 |

The first and second classifications and identified code violations, such as those given in the exemplary embodiment as expressed in Tables 2–12, may be expressed using Boolean equations that express the bit values of the encoder output codeword $\xi$ as a function of the bit values of the input dataword $\bar{\xi}$. For the following equations, a "&" expression indicates a logical AND operation, a "+" expression indicates a logical OR operation, and a "!" expression indicates a logical complement.

First, a pre-encoder set of equations of the exemplary embodiment of the present invention is defined by equation (1) through equation (14):

$$l1=(a(1)+a(2)+a(3))=L1 \quad (1)$$

$$l2=(a(2)+a(3)+a(4)+a(5)+a(6)+a(7))=L2 \quad (2)$$

$$l3=(a(3)+a(4)+a(5)+a(6)+a(7)+a(8))=L3 \quad (3)$$

$$r1=(a(14)+a(15)+a(16))=R1 \quad (4)$$

$$r2=(a(10)+a(11)+a(12)+a(13)+a(14)+a(15))=R2 \quad (5)$$

$$r3=(a(9)+a(10)+a(11)+a(12)+a(13)+a(14))=R3 \quad (6)$$

$$L=l1 \ \& \ l2 \ \& \ l3 \quad (7)$$

$$LC=!L=!(l1 \ \& \ l2 \ \& \ l3) \quad (8)$$

$$l1o=(!(l1) \ \& \ l2 \ \& \ l3)=L1X \quad (9)$$

$$l1oc=!l1o=L1XC \quad (10)$$

$$R=r1 \ \& \ r2 \ \& \ r3 \quad (11)$$

$$RC=!R=!(r1 \ \& \ r2 \ \& \ r3) \quad (12)$$

$$r1o=(!(r1) \ \& \ r2 \ \& \ r3)=R1X \quad (13)$$

$$r1oc=!r1o=R1XC \quad (14)$$

Once the pre-encoder set of equations is defined, the bit values for the output codeword elements z(1), z(2) ... z(17) may be given for the exemplary embodiment as set forth in equations 15–31:

$$z(1)=(a(1)\&L)+(LC\&((a(8)\&l1o)+(1\&i1oc))) \quad (15)$$

$$z(2)=(a(2)\&L)+(LC\&((a(9)\&l1o)+(a(1)\&l1oc))) \quad (16)$$

$$z(3)=(a(3)\&L)+(LC\&((1\&l1oc))) \quad (17)$$

$$z(4)=(a(4)\&L)+(LC\&((a(4)\&l1oc)+(a(2)\&l1oc))) \quad (18)$$

$$z(5)=(a(5)\&L)+(LC\&((a(5)\&l1oc)+(a(8)\&l1oc))) \quad (19)$$

$$z(6)=(a(6)\&L)+(LC\&((a(6)\&l1oc)+(a(9)\&l1oc))) \quad (20)$$

$$z(7)=(a(7)\&L)+(LC\&((a(7)\&l1oc)+(1\&l1oc))) \quad (21)$$

$$z(8)=(R\&((a(8)\&L)+(0\&LC)))+(1\&RC) \quad (22)$$

$$z(9)=(1\&L\&R)+(0\&(!(L\&R))) \quad (23)$$

$$z(10)=(L\&(a(9)\&R)+(0\&RC))+(LC\&1) \quad (24)$$

$$z(11)=(a(10)\&R)+(RC\&((a(10)\&r1o)+(1\&r1oc))) \quad (25)$$

$$z(12)=(a(11)\&R)+(RC\&((a(11)\&r1o)+(a(8)\&r1oc))) \quad (26)$$

$$z(13)=(a(12)\&R)+(RC\&((a(12)\&r1o)+(a(9)\&r1oc))) \quad (27)$$

$$z(14)=(a(13)\&R)+(RC\&((a(13)\&r1o)+(a(15)\&r1oc))) \quad (28)$$

$$z(15)=(a(14)\&R)+(RC\&((1\&r1o)+(0\&r1oc))) \quad (29)$$

$$z(16)=(a(15)\&R)+(RC\&((a(8)\&r1o)+(a(16)\&r1oc))) \quad (30)$$

$$z(17)=(a(16)\&R)+(RC\&((a(9)\&r1o)+(1\&r1oc))) \quad (31)$$

The logical operations of the set of encoder equations may be minimized further by factoring common terms of equations (15) through (31); consequently, terms may be pre-calculated and pre-encoded to determine further operations on input bits. Using the following factors given in equations (32) through (39):

$$OZ1=(a(8)\&L1X)+(L1XC) \quad (32)$$

$$OZ2=(a(9)\&L1X)+(a(1)\&L1XC) \quad (33)$$

$$OZ4A=(LC\&L1X)+L \quad (34)$$

$$OZ4B=(!(L+L1X) \quad (35)$$

$$OZ17=(a(9)\&R1X)+(R1XC) \quad (36)$$

$$OZ16=(a(8)\&R1X)+(a(16)\&R1XC)) \quad (37)$$

$$OZ14A=(RC\&R1X)+R \quad (38)$$

$$OZ14B=(!(R+R1X) \quad (39)$$

and the encoder equations for the elements of codeword $\xi$ are given as equations (15') through (31'):

$$z(1)=(a(1)\&L)+(OZ1\&LC) \quad (15')$$

$$z(2)=(a(2)\&L)+(OZ2\&LC) \quad (16')$$

$$z(3)=(a(3) \& OZ4A)+(L1X \& LC) \qquad (17')$$

$$z(4)=(a(4) \& OZ4A)+(a(2) \& OZ4B) \qquad (18')$$

$$z(5)=(a(5) \& OZ4A)+(a(8) \& OZ4B) \qquad (19')$$

$$z(6)=(a(6) \& OZ4A)+(a(9) \& OZ4B) \qquad (20')$$

$$z(7)=(a(7) \& OZ4A)+(OZ4B) \qquad (21')$$

$$z(8)=(a(8) \& z(9))+RC \qquad (22')$$

$$z(9)=!(RC+LC) \qquad (23')$$

$$z(10)=(a(9) \& z(9))+(LC) \qquad (24')$$

$$z(11)=(a(10) \& OZ14A)+(OZ14B) \qquad (25')$$

$$z(12)=(a(11) \& OZ14A)+(a(8) \& OZ14B) \qquad (26')$$

$$z(13)=(a(12) \& OZ14A)+(a(9) \& OZ14B) \qquad (27')$$

$$z(14)=(a(13) \& OZ14A)+(a(15) \& OZ14B) \qquad (28')$$

$$z(15)=(a(14) \& OZ14A)+(R1X \& RC) \qquad (29')$$

$$z(16)=(a(15) \& R)+(OZ16 \& RC) \qquad (30')$$

$$z(17)=(a(16) \& R)+(OZ17 \& RC) \qquad (31')$$

Block Encoding System

Figure 2:
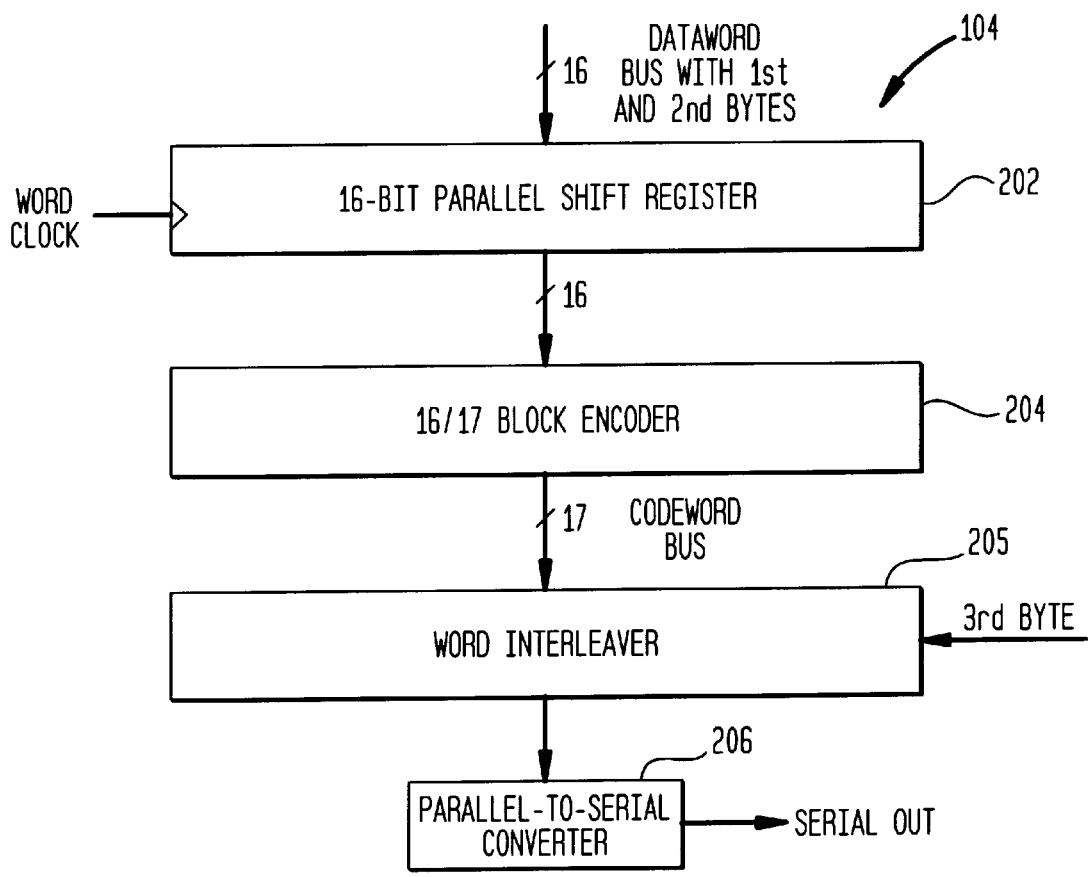
FIG. 2 is a block diagram showing a modulation encoder in accordance with an exemplary embodiment of the present invention.

Returning to FIG. 1, the modulation encoder 104 encodes datawords A of three bytes in accordance with the 24/25 (0,9) code construction described previously. FIG. 2 is a block diagram showing a block diagram of modulation encoder 104 in accordance with an exemplary embodiment of the present invention. The modulation encoder 104 includes a parallel shift register 202, 16/17 (0,5) block encoder 204, word interleaver 205, and parallel to serial converter 206. The 16/17 (0,5) block encoder 204 of FIG. 2 constructs an output codeword ξ from the first two bytes of the dataword A received by the modulation encoder 104. Datawords of three bytes are divided into a first sequence of 16 bits and a second sequence of 8 bits. For the first sequence of 16 bits, an output codeword ξ=z(1), z(2), . . . z(17) from the dataword A'=a(1), a(2) . . . a(16) is constructed using the 16/17 (0,5) code construction as previously described.

The first sequence of 16 bits in parallel is received by shift register 202 that sequentially provides 16-bit parallel words to the 16/17 (0,5) block encoder 204 in accordance with a word clock signal. 16/17 (0,5) block encoder constructs 16/17 (0,5) output codeword ξ based on the input word. Each codeword ξ is provided as a 17-bit parallel word to the word interleaver 205. The word interleaver 205 divides the second sequence of 8 bits (or third byte) into two nibbles, and inserts the two nibbles into the 16/17 (0,5) output codeword ξ. The 25 parallel-bit, 24/25 (0,9) codeword Z is then converted to a serial bit stream by parallel to serial converter 206 in accordance with a symbol clock signal.

Figure 3:
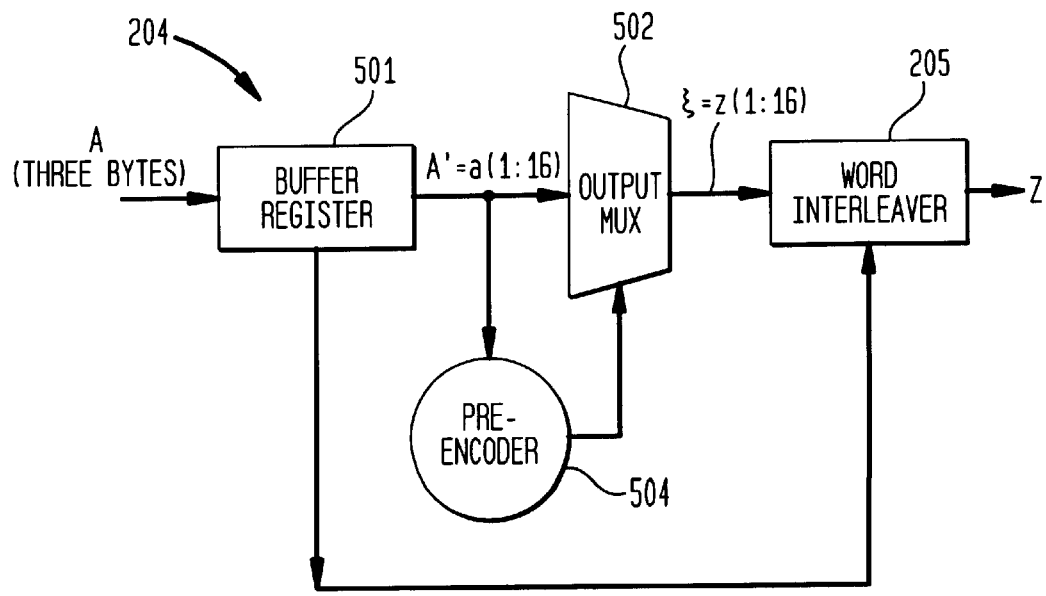
FIG. 3 is a block diagram of a 24/25 (0,9) block encoder incorporating a 16/17 (0,5) block encoder having a minimized encoding equation set in accordance with an exemplary embodiment of the present invention.

FIG. 3 is a block diagram of a 24/25 (0,9) block encoder as shown in FIG. 2 of an exemplary embodiment having a minimized encoding equation set in accordance with the present invention. The input dataword A is provided to a buffer register 501 that separates the dataword into the two byte word A' and the third byte. The input dataword A' is provided to both an output mux 502 and a pre-encoder 504. Pre-encoder 504 provides intermediate variable values corresponding to the intermediate variables given in equations (1) through (14) and (32) through (39), which equations are derived from the code violations as described previously. Using the intermediate variable values, output mux 502 provides the output codeword ξ bits z(1), z(2), . . . z(17) in accordance with the minimized set of encoder equations (15') through (31'), respectively. Word interleaver 205 then interleaves the third byte into the codeword ξ to provide the codeword Z.

Figure 4A:
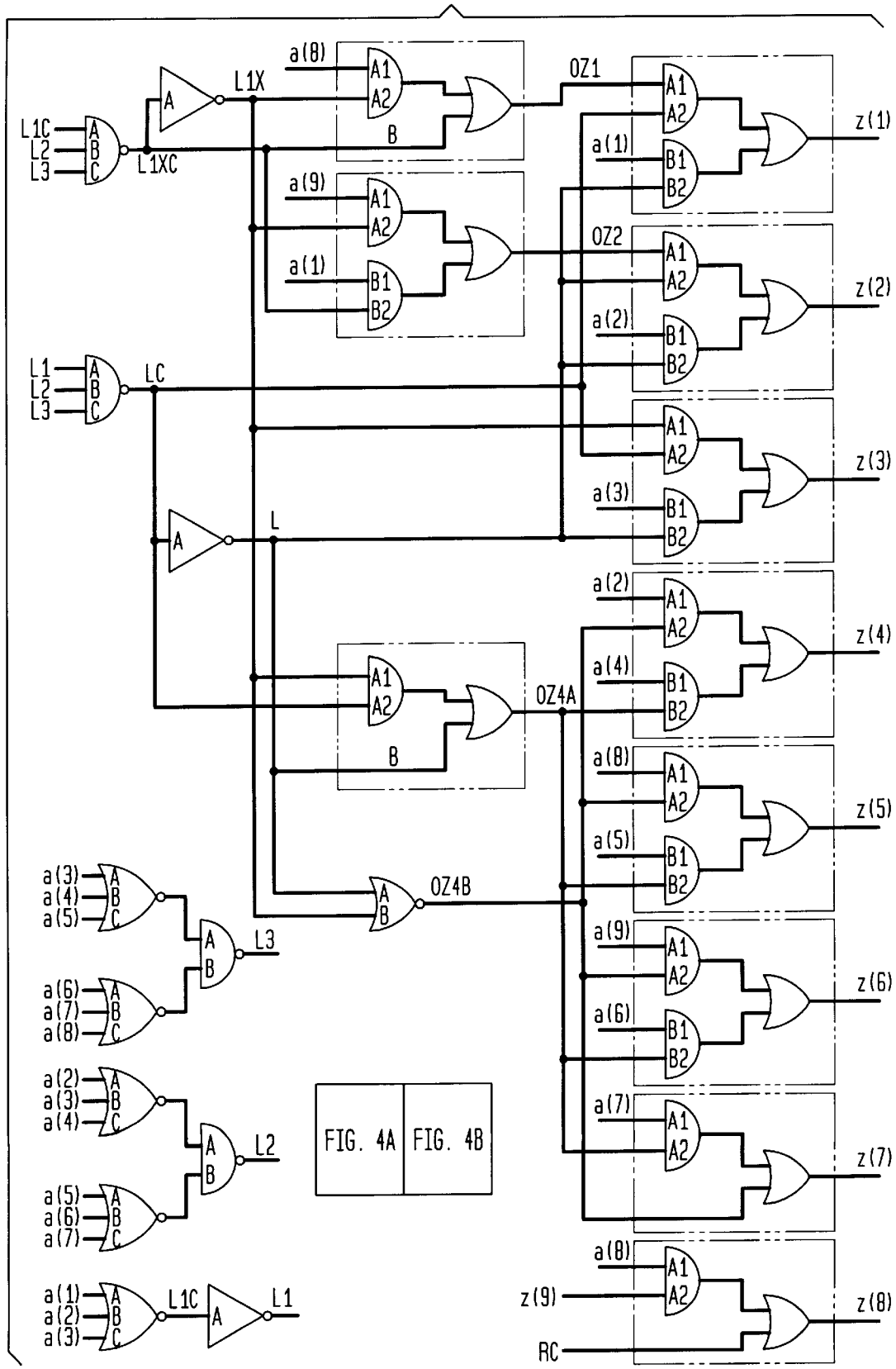
FIG. 4A is a first half of a 16/17 (0,5) block encoder circuit implementing a minimized encoding equation set in accordance with an exemplary embodiment of the present invention.
Figure 4B:
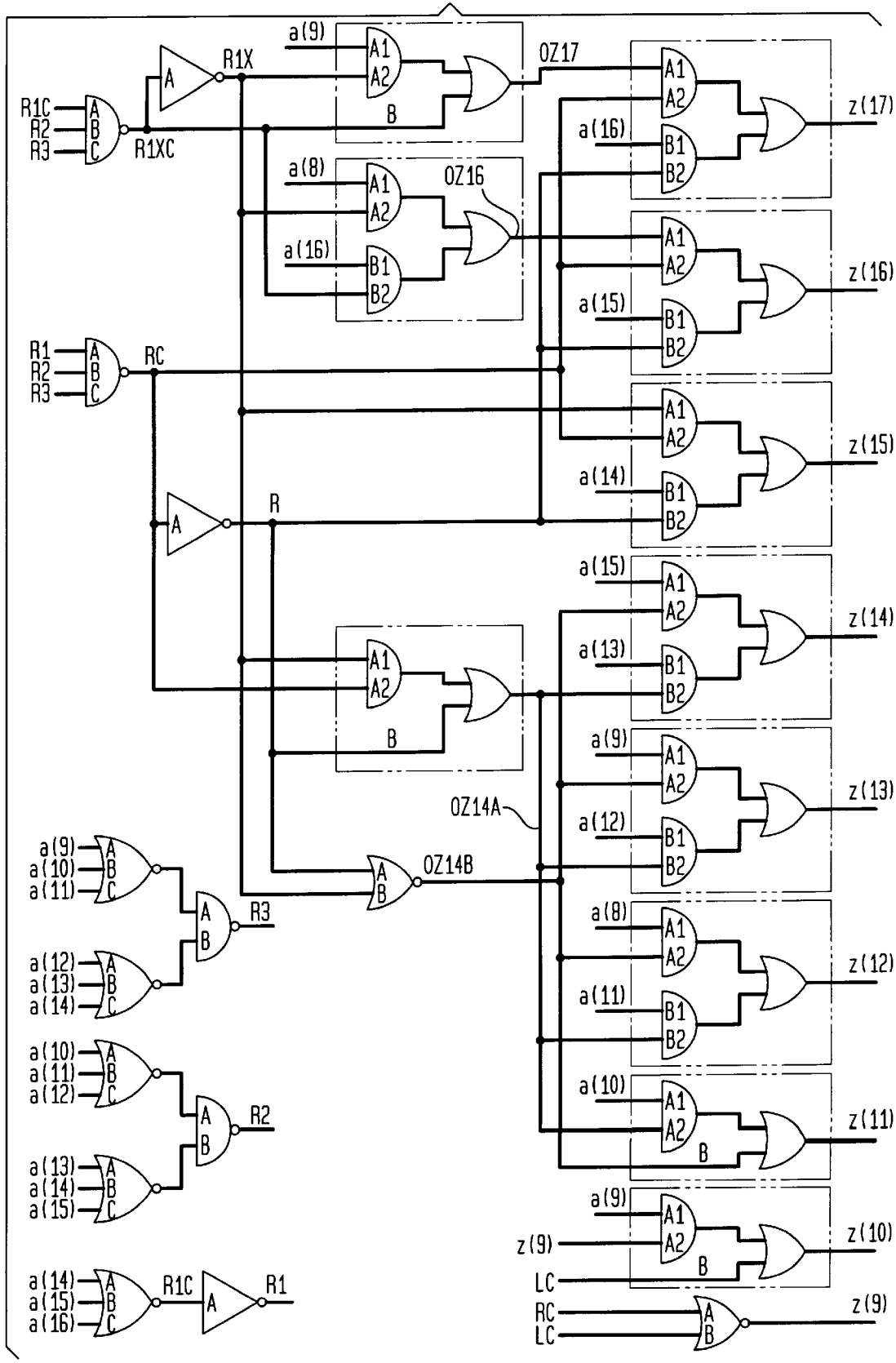
FIG. 4B is a second half of a 16/17 (0,5) block encoder circuit implementing a minimized encoding equation set in accordance with an exemplary embodiment of the present invention.

FIGS. 4A and 4B are first and second halves, respectively, of a 16/17 (0,5) block encoder circuit encoding a rate 16/17 (0,5) code with a minimized encoding equation set as given by equations (15') through (31') in accordance with the exemplary embodiment of the present invention.

Block Decoding

The unprecoder 114 of the exemplary system 100 of FIG. 1 reverses the preceding operation of the precoder 106, and provides output codewords to the modulation decoder 116. The modulation decoder 116 decodes the symbol sequence in accordance with the 16/17 (0,5) code construction of the present invention to provide a sequence of datawords.

Figure 5:
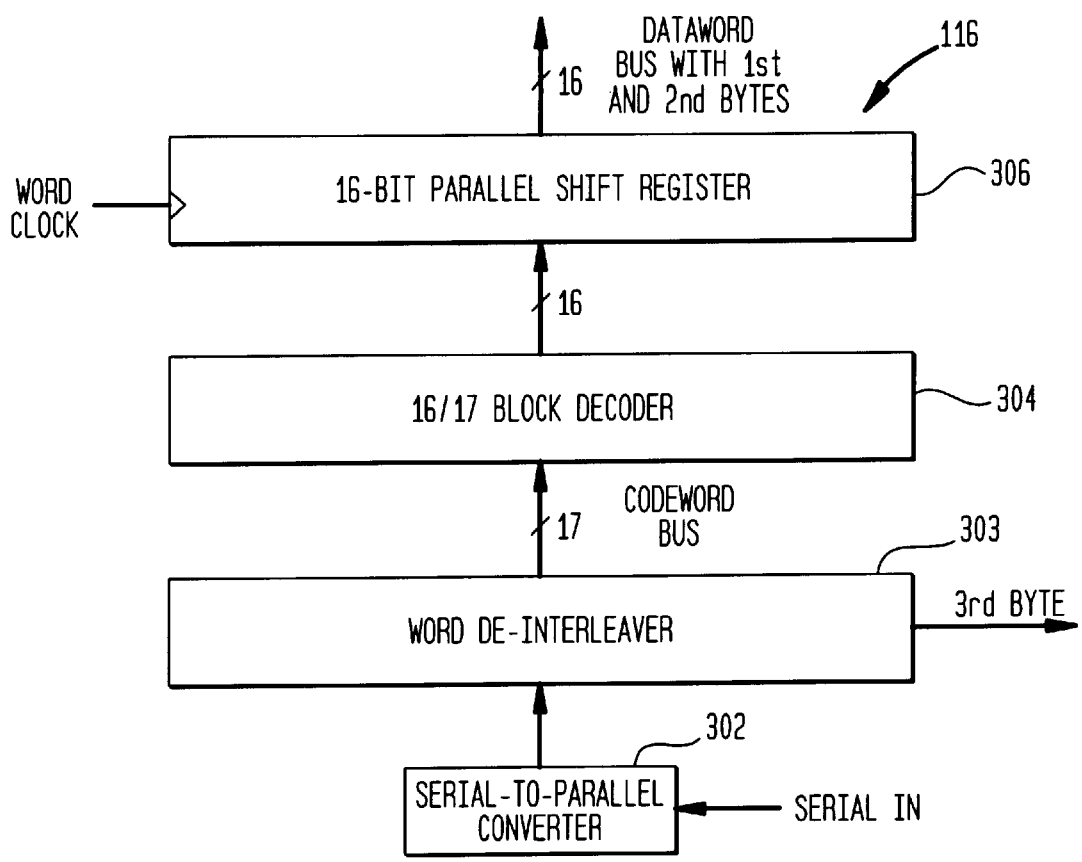
FIG. 5 is a block diagram showing a modulation decoder in accordance with an exemplary embodiment of the present invention.

FIG. 5 is a block diagram showing the modulation decoder 116 of FIG. 1 in accordance with an exemplary embodiment of the present invention. The modulation decoder includes a serial to parallel converter 302, 16/17 (0,5) block decoder 304 and parallel shift register 306. Codewords Z are provided as a serial symbol stream and are converted to a parallel bit stream by serial to parallel converter 302 in accordance with a symbol clock signal. The word de-interleaver removes the third byte from the codeword Z to provide the codeword ξ to the 16/17 (0,5) block decoder 304. The 16/17 (0,5) block decoder 304 constructs an output dataword A' corresponding to the based on the input 16/17 (0,5) codeword ξ. The 16/17 block decoder 304 provides these datawords A' of 16 bits to the shift register 306. Datawords of 16 bits in parallel are then sequentially provided by shift register 306 in accordance with a word clock signal. In a similar manner as described with respect to the modulation encoder 104, a codeword is converted to a corresponding dataword while the next codeword is received in the serial to parallel converter 302.

Decoder Equations

The modulation decoder examines various defined pivot bits of the input codeword ξ=z(1), z(2), . . . z(17) before providing a re-formatted codeword having 16 elements using the 17 elements z(1), z(2), . . . z(17). As discussed previously with respect to the code construction, the input codeword ξ is formed based on the absence or detected presence of one or more predefined code violations within the original dataword â. Consequently, the modulation decoder in accordance with the exemplary embodiment of the present invention interprets the values of the pivot bits to re-constitute the bit values for elements causing the code violations defined by the pivot bits, thereby providing a 16-bit words (for the first and second bytes of dataword A) having element values from codeword ξ as given in the following Tables 13–21.

Table 13 gives the word for the case of pbm=1, in which no code violations are present in the original dataword A'.

TABLE 13

| z(1) | z(2) | z(3) | z(4) | z(5) | z(6) | z(7) | z(8) | z(10) | z(11) | z(12) | z(13) | z(14) | z(15) | z(16) | z(17) |
|---|---|---|---|---|---|---|---|---|---|---|---|---|---|---|---|

Table 14 gives the word for the case of pbm=0, pbl=0, pbr=1, and pb1a=1 in which no code violations occur in the right string of the original dataword A', but an l1-only code violation occurs in the left string.

code violations occur in the left and right strings of the original dataword A' except an l1-only and an r1-only code violation.

TABLE 14

| 0 | 0 | 0 | z(4) | z(5) | z(6) | z(7) | z(1) | z(2) | z(11) | z(12) | z(13) | z(14) | z(15) | z(16) | z(17) |
|---|---|---|---|---|---|---|---|---|---|---|---|---|---|---|---|

Table 15 gives the word for the case of pbm=0, pbl=0, pbr=1, and pb1a=0 in which no code violations occur in the right string of the original dataword A', but any code violation other than an l1-only violation occurs in the left string.

TABLE 15

| z(2) | z(4) | 0 | 0 | 0 | 0 | 0 | z(5) | z(6) | z(11) | z(12) | z(13) | z(14) | z(15) | z(16) | z(17) |
|---|---|---|---|---|---|---|---|---|---|---|---|---|---|---|---|

Table 16 gives the word for the case of pbm=0, pbl=1, pbr=0, and pb2a=1 in which no code violations occur in the left string of the original dataword A', but an r1-only code violation occurs in the right string.

TABLE 16

| z(1) | z(2) | z(3) | z(4) | z(5) | z(6) | z(7) | z(16) | z(17) | z(11) | z(12) | z(13) | z(14) | 0 | 0 | 0 |
|---|---|---|---|---|---|---|---|---|---|---|---|---|---|---|---|

Table 17 gives the word for the case of pbm=0, pbl=1, pbr=0, and pb2a=0 in which no code violations occur in the left string of the original dataword A', but any violation other than an r1-only code violation occurs in the right string.

TABLE 17

| z(1) | z(2) | z(3) | z(4) | z(5) | z(6) | z(7) | z(12) | z(13) | 0 | 0 | 0 | 0 | 0 | z(14) | z(16) |
|---|---|---|---|---|---|---|---|---|---|---|---|---|---|---|---|

Table 18 gives the word for the case of pbm=0, pbl=1, pbr=1, pb1a=1, and pb2a=1, in which an l1-only code violation occurs in the left string of the original dataword A', and an r1-only code violation occurs in the right string.

TABLE 18

| 0 | 0 | 0 | z(4) | z(5) | z(6) | z(7) | z(1) | z(17) | z(11) | z(12) | z(13) | z(14) | 0 | 0 | 0 |
|---|---|---|---|---|---|---|---|---|---|---|---|---|---|---|---|

Table 19 gives the word for the case of pbm=0, pbl=1, pbr=1, pb1a=0, and pb2a=0, in which any combination of

TABLE 19

| z(2) | z(4) | 0 | 0 | 0 | 0 | 0 | z(5) | z(13) | 0 | 0 | 0 | 0 | 0 | z(14) | z(16) |
|---|---|---|---|---|---|---|---|---|---|---|---|---|---|---|---|

Table 20 gives the word for the case of pbm=0, pbl=1, pbr=1, pb1a=0, and pb2a=1, in which any combination of left string code violations occur except an l1-only code violation, and an r1 only code violation occurs in the right string.

TABLE 20

| z(2) | z(4) | 0 | 0 | 0 | 0 | 0 | z(5) | z(17) | z(11) | z(12) | z(13) | z(14) | 0 | 0 | 0 |
|---|---|---|---|---|---|---|---|---|---|---|---|---|---|---|---|

Table 21 gives the word for the case of pbm=0, pbl=1, pbr=1, pb1a=1, and pb2a=0, in which an l1 only code violation occurs in the left string of the original dataword A', and any combinations of code violations except the r1-only code violation occurs in the right string.

TABLE 21

| 0 | 0 | 0 | z(4) | z(5) | z(6) | z(7) | z(1) | z(13) | 0 | 0 | 0 | 0 | 0 | z(14) | z(16) |
|---|---|---|---|---|---|---|---|---|---|---|---|---|---|---|---|

To provide decoded 16 bit words as given in Tables 13–21, Boolean equations may be formed to express the relationship between the input element values of codeword $\xi$ with the output element values of the decoded dataword A'. First, the various pivot bits are defined as pb1a=z(3), pbl=z(8), pbm=z(9), pbr=z(10) and pb2a=z(15). For the following equations (40) through (81), a "&" expression indicates a logical AND operation, a "+" expression indicates a logical OR operation, and a "!" expression indicates a logical complement. Defining a pre-decoder set of equations (40) through (43) as:

$$t1 = (!pbl \& pbr) + (pbl \& pbr) \tag{40}$$

$$t1a = (pbl \& !pbr) \tag{41}$$

$$t2 = (pbl \& !pbr) + (pbl \& pbr) \tag{42}$$

$$t2a = (!pbl \& pbr) \tag{43}$$

Then the decoded output bits d(1), d(2), ..., d(16) corresponding to a(1), a(2) ..., a(16) are given by equations (44) through (59):

$$d(1) = (z(1) \& pbm) + ((!pbm) \& (((0 \& pb1a) + (z(2) \& (!pb1a)) \& (t1)) + (z(1) \& t1a))) \tag{44}$$

$$d(2) = (z(2) \& pbm) + ((!pbm) \& (((0 \& pb1a) + (z(4) \& (!pb1a)) \& (t1)) + (z(2) \& t1a))) \tag{45}$$

$$d(3) = (z(3) \& pbm) + ((!pbm) \& ((pbl \& (!pb2) \& z(3)) + 0)) \tag{46}$$

$$d(4) = (z(4) \& pbm) + ((!pbm) \& (((z(4) \& pb1a) + (0 \& (!pb1a)) \& (t1)) + (z(4) \& t1a))) \tag{47}$$

$$d(5) = (z(5) \& pbm) + ((!pbm) \& (((z(5) \& pb1a) + (0 \& (!pb1a)) \& (t1)) + (z(5) \& t1a))) \tag{48}$$

$$d(6) = (z(6) \& pbm) + ((!pbm) \& (((z(6) \& pb1a) + (0 \& (!pb1a)) \& (t1)) + (z(6) \& t1a))) \tag{49}$$

$$d(7) = (z(7) \& pbm) + ((!pbm) \& (((z(7) \& pb1a) + (0 \& (!pb1a)) \& (t1)) + (z(7) \& t1a))) \tag{50}$$

$$d(8) = (z(8) \& pbm) + ((!pbm) \& (((z(1) \& pb1a) + (z(5) \& (!pb1a)) \& (t1)) + (((pb2a \& z(16)) + ((!pb2a) \& z(12))) \& t1a)) \tag{51}$$

$$d(9) = (z(10) \& pbm) + ((!pbm) \& (((z(2) \& pb1a) + (z(6) \& (!pb1a)) \& (t2a)) + ((pb2a \& z(17)) + ((!pb2a) \& z(13))) \& t2))) \tag{52}$$

$$d(10) = (z(11) \& pbm) + ((!pbm) \& (((z(11) \& pb2a) + (0 \& (!pb2a)) \& (t2)) + (z(11) \& t2a))) \tag{53}$$

$$d(11) = (z(12) \& pbm) + ((!pbm) \& (((z(12) \& pb2a) + (0 \& (!pb2a)) \& (t2)) + (z(12) \& t2a))) \tag{54}$$

$$d(12) = (z(13) \& pbm) + ((!pbm) \& (((z(13) \& pb2a) + (0 \& (!pb2a)) \& (t2)) + (z(13) \& t2a))) \tag{55}$$

$$d(13) = (z(14) \& pbm) + ((!pbm) \& (((z(14) \& pb2a) + (0 \& (!pb2a)) \& (t2)) + (z(14) \& t2a))) \tag{56}$$

$$d(14) = (z(15) \& pbm) + ((!pbm) \& (((((!pbl) \& pb2) \& z(15)) + 0)) \tag{57}$$

$$d(15) = (z(16) \& pbm) + ((!pbm) \& (((0 \& pb2a) + (z(14) \& (!pb2a)) \& (t2)) + (z(16) \& t2a))) \tag{58}$$

$$d(16) = (z(17) \& pbm) + ((!pbm) \& (((0 \& pb2a) + (z(16) \& (!pb2a)) \& (t2)) + (z(17) \& t2a))) \tag{59}$$

The logical operations of the set of decoder equations may be minimized further by factoring common terms of equations (44) through (59); consequently, terms may be pre-calculated and pre-decoded to determine further operations on input bits of the codewords $\xi$. Using the following factors given in equations (60) through (81):

$$AC = !(z(3)) \tag{60}$$

$$BC = !(z(8)) \tag{61}$$

$$CC = !(z(9)) \tag{63}$$

$$DC = !(z(10)) \tag{64}$$

$$EC = !(z(15)) \tag{65}$$

$$T1 = (z(8) \& z(10)) + (T2A) \tag{66}$$

$$T1A = !(z(10) + BC) \tag{67}$$

$$T1B = (z(3) \& T1) + (T1A) \tag{68}$$

$$T1C = (T1B \& CC) + (z(9)) \tag{69}$$

$$T2 = (z(8) \& z(10)) + (T1A) \tag{70}$$

$$T2A = !(z(8) + DC) \tag{71}$$

$$T2B = (z(15) \& T2) + (T2A) \tag{72}$$

$$T2C = (T2B \& CC) + (z(9)) \tag{73}$$

$$IZ1 = (AC \& CC \& T1) \tag{74}$$

$$IZ2 = (z(9) + T1A) \tag{75}$$

$$IZ3 = (z(8) \& CC \& DC) + (z(9)) \tag{76}$$

$$IZ8 = ((T1 \& ((z(1) \& z(3)) + ((z(5) \& AC)) + ((T1A((z(15) \& z(16)) +$$

$$(z(12)\&EC))) \quad (77)$$

$$IZ9=((T1\&((z(2)\&z(3))+((z(6)\&AC))+((T1A((z(15)\&z(17))+(z(13)\&EC))) \quad (78)$$

$$IZ14=(z(10)\&CC\&BC)+(z(9)) \quad (79)$$

$$IZ15=(z(9)+T2A) \quad (80)$$

$$IZ16=EC\&CC\&T2 \quad (81)$$

the minimized decoder equations (44') through (59') are as given below.

$$d(1)=(z(1)\&IZ2)+(z(2)\&IZ1) \quad (44')$$

$$d(2)=(z(2)\&IZ2)+(z(4)\&IZ1) \quad (45')$$

$$d(3)=(z(3)\&IZ3) \quad (46')$$

$$d(4)=(z(4)\&T1C) \quad (47')$$

$$d(5)=(z(5)\&T1C) \quad (48')$$

$$d(6)=(z(6)\&T1C) \quad (49')$$

$$d(7)=(z(7)\&T1C) \quad (50')$$

$$d(8)=(z(8)\&z(9))\&(CC\&IZ8) \quad (51')$$

$$d(9)=(z(10)\&z(9))\&(CC\&IZ9) \quad (52')$$

$$d(10)=(z(11)\&T2C) \quad (53')$$

$$d(11)=(z(12)\&T2C) \quad (54')$$

$$d(12)=(z(13)\&T2C) \quad (55')$$

$$d(13)=(z(14)\&T2C) \quad (56')$$

$$d(14)=(z(15)\&IZ14) \quad (57')$$

$$d(15)=(z(16)\&IZ15)+(z(14)\&IZ16) \quad (58')$$

$$d(16)=(z(17)\&IZ15)+(z(16)\&IZ16) \quad (59')$$

Figure 6:
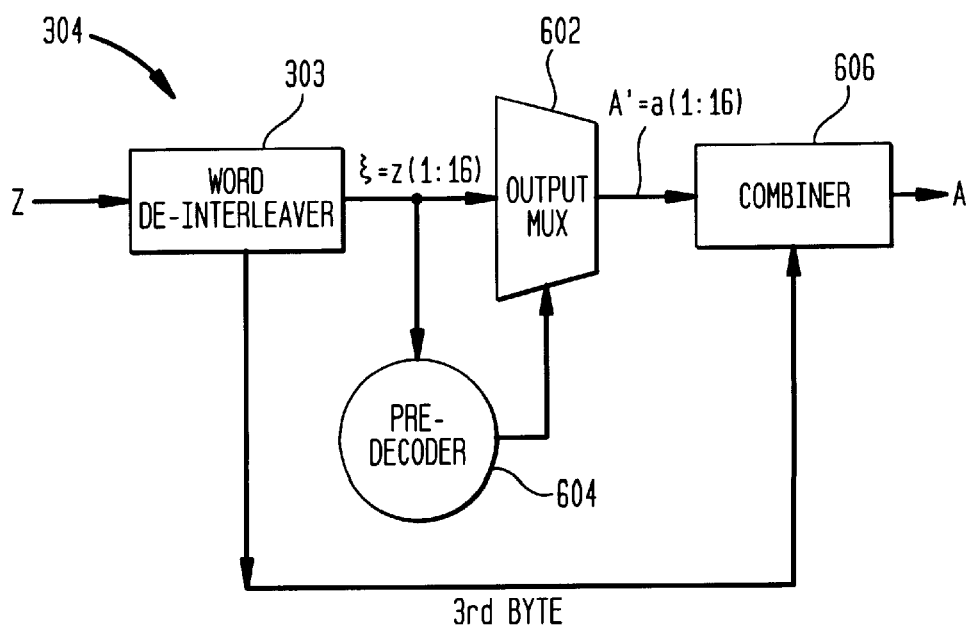
FIG. 6 is a block diagram of a 24/25 (0,9) block decoder incorporating a 16/17 (0,5) block decoder having a minimized decoding equation set in accordance with an exemplary embodiment of the present invention.

FIG. 6 is a block diagram of a 24/25 (0,9) block decoder 304 as shown in FIG. 5 of an exemplary embodiment having a minimized decoding equation set in accordance with the present invention. The input codeword Z is provided to word de-interleaver 303 which provides the third byte and the codeword ξ=z(1), z(2), ... z(17). Codeword ξ=z(1), z(2), ... z(17) is provided to both an output mux 602 and a pre-decoder 604. Pre-decoder 604 provides intermediate variable values corresponding to the intermediate variables given in equations (40) through (43) and (60) through (81) described previously, and which are derived from the 16/17 (0,5) code construction, which construction is as described previously. Using the intermediate variable values, output mux 602 provides the output received dataword bits d(1), d(2), ... d(16), corresponding to a(1) through a(16) of the two bytes (codeword A') of codeword A, in accordance with equations (44) through (59), or (44') through (59'), respectively. A combiner 606 receives the first and second bytes (A') from the output mux 602 and the third byte from the word de-interleaver 303, and then combines the three bytes to from the dataword A.

Figure 7A:
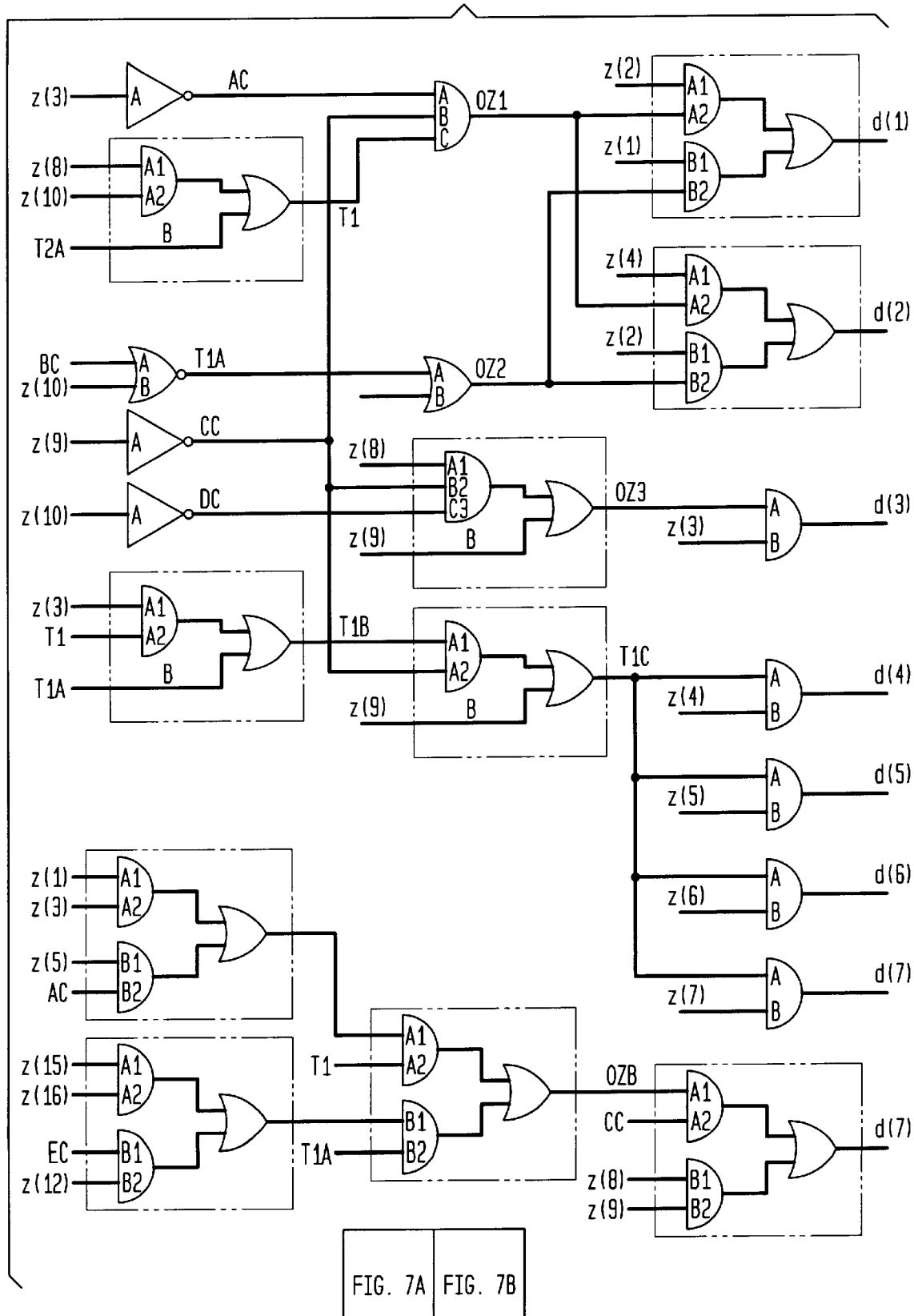
FIG. 7A is a first half of a 16/17 (0,5) block decoder circuit implementing a minimized decoding equation set in accordance with an exemplary embodiment of the present invention; and, FIG. 7B is a second half of a 16/17 (0,5) block decoder circuit implementing a minimized decoding equation set in accordance with an exemplary embodiment of the present invention.
Figure 7B:
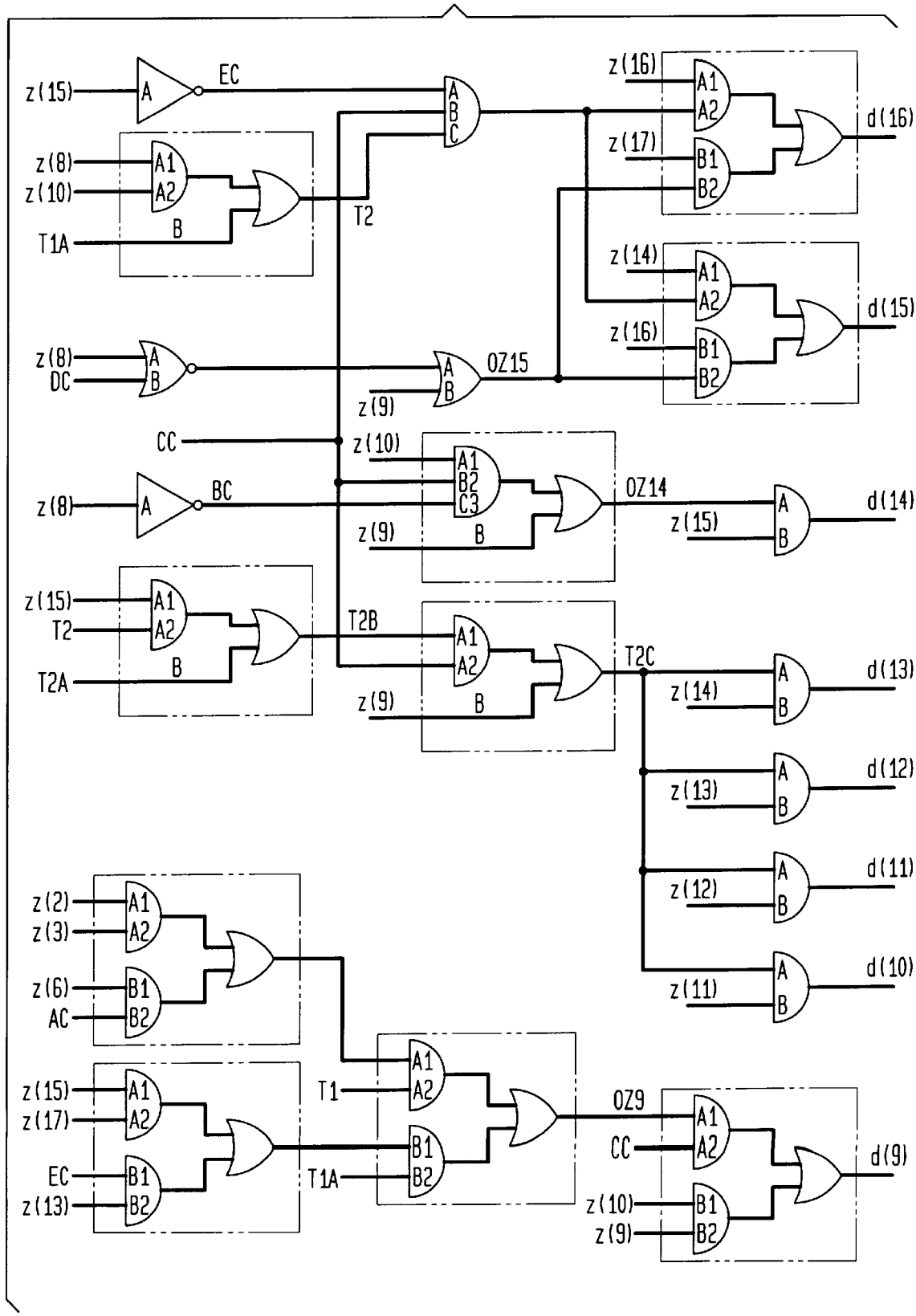

FIGS. 7A and 7B are first and second halves of a 16/17 (0,5) block decoder circuit decoding a rate 16/17 (0,5) code with the minimized decoding equations (44') through (59') in accordance with the exemplary embodiment of the present invention.

While the exemplary embodiments of the present invention have been described with respect to processes of circuits, the present invention is not so limited. As would be apparent to one skilled in the art, various functions of circuit elements may also be implemented in the digital domain as processing steps in a software program. Such software may be employed in, for example, a digital signal processor, micro-controller or general purpose computer.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. Apparatus for encoding three bytes of binary data as a 24/25 (0,9) codeword, the apparatus comprising:

a storage circuit, coupled to an input stream to receive the three bytes, to store the first and second bytes as first and second bit strings and the third byte as first and second nibbles;

a processor, coupled to the storage circuit, adapted to determine, in accordance with a 16/17 (0,5) code construction, whether each of the first and second bit strings contains at least one code violation, each code violation corresponding to a given bit sequence, the processor identifying a type and a position of the code violation;

an encoder circuit, coupled to an input stream to receive the two bytes from the storage circuit, adapted to insert a pivot bit between the first and second strings and encode the first and second bit strings with the pivot bit inserted therebetween into a 16/17 (0,5) codeword based on the type and the position of each code violation identified by the processor, wherein the encoder circuit encodes by correcting, as necessary, any code violation in the first and second bit strings by 1) setting the inserted pivot bit to a first value, 2) defining values for a bit in each of the first and second bit strings as additional pivot bits, the additional pivot bits identifying the type and the position of each code violation, 3) preserving values for bits not included in the given bit sequence corresponding to the code violation, and 4) assigning values, as necessary, for one or more bits of the given bit sequence; and a word interleaver adapted to insert the first and second nibbles of the third byte adjacent to the additional pivot bits of the first and second bit strings in the 16/17 (0,5) codeword, respectively, to produce the 24/25 (0,9) codeword.

2. The invention as recited in claim 1, wherein, when the processor determines no code violation exists, the encoder circuit sets the inserted pivot bit to a second value and the word interleaver provides the 24/25 (0,9) codeword as the first and second bit strings with the inserted pivot bit therebetween set to the second value and the first and second nibbles inserted adjacent to the bit positions of the first and second bit strings corresponding to the additional pivot bits.

3. The invention as recited in claim 2, wherein:

each code violation is one of a set of code violations, the set of code violations including an end code violation having the given bit sequence corresponding to a first number of consecutive bit values occurring at one end of one of the first and second bits strings, the one end not adjacent to the inserted pivot bit, and the set of code violations including at least one other code violation having the given bit sequence corresponding to a second number of consecutive bit values within one of the first and the second bit strings.

4. The invention as recited in claim 3, wherein the first number of consecutive bit values of the end code violation corresponds to three consecutive zero values, and the predetermined number of consecutive bit values of each other code violation corresponds to six consecutive zero values, thereby to form the 16/17 (0,5) codeword.

5. The invention as recited in claim 1, wherein the apparatus is included in a modulation encoder of a partial response magnetic recording system having a modulation precoder and a magnetic recording head, the codeword is provided to the modulation precoder which precodes the codeword, and the modulation precoded codeword is recorded on the magnetic media by the magnetic recording head.

6. The invention as recited in claim 5, wherein the modulation precoder of the partial response magnetic recording system is a $1/(1 \oplus D^2)$ precoder.

7. Apparatus for decoding a 24/25 (0,9) codeword to provide first, second and third bytes representing binary data, the apparatus comprising:
  a word de-interleaver adapted to divide the 24/25 (0,9) codeword into first and second nibbles and a 16/17 (0,5) codeword based on a set of pivot bits of the 24/25 (0,9) codeword, the first and second nibbles forming the third byte;
  a storage circuit, coupled to receive the 16/17 (0,5) codeword, adapted to store the 16/17 (0,5) codeword as N symbols;
  a processor, coupled to the storage circuit, adapted to provide preserved bits from the N symbols of the 16/17 (0,5) codeword based on the set of pivot bits and determines, from the set of pivot bits, whether the first and second bytes include a code violation, the set of pivot bits identifying a type and a position of any code violation in the first and second bytes, each code violation corresponding to a given bit sequence within the first and second bytes; and
  a decoder circuit adapted to form the first and second bytes from the preserved bits and the given bit sequence of each code violation in accordance with the set of pivot bits,
  wherein the decoder circuit decodes by reconstructing, as necessary, any code violation in the first and second bytes as the given bit sequence having the type and at the position as defined by the set of pivot bits, and by assigning the preserved bits to respective locations in the first and second bytes in accordance with the set of pivot bits.

8. The invention as recited in claim 7, wherein:
  the processor is a pre-decoding processor which provides a set of logic combination signals based on selected ones of the N symbols of the 16/17 (0,5) codeword; and
  the decoder circuit is a multiplexer having a set of selection circuits, each of the set of selection circuits coupled to receive respective symbols of the 16/17 (0,5) codeword and respective ones of the set of logic combination signals,
  wherein the set of selection circuits preserves values and assigns values of the symbols of the codeword, as necessary, in response to the set of logic combination signals to form the first and second bytes.

9. The invention as recited in claim 8, wherein the apparatus is included in a modulation decoder of a partial response magnetic recording system having a magnetic read head and a modulation un-precoder, the 24/25 (0,9) codeword being precoded and recorded on the magnetic media, the precoded 24/25 (0,9) codeword being read from the magnetic media by the magnetic read head and provided to the modulation un-precoder which un-precodes and provides the codeword to the decoder circuit.

10. A method of encoding a first, second and third bytes of binary data as a 24/25 (0,9) codeword, the method comprising the steps of:
  (a) dividing 1) the first and second bytes into first and second bit strings by inserting a pivot bit therebetween, and 2) the third byte into first and second nibbles;
  (b) determining whether each of the first and second bit strings contains at least one code violation in accordance with a 16/17 (0,5) code construction, each code violation corresponding to a given bit sequence;
  (c) correcting, as necessary, any code violation in the first and second bit strings by:
    (c1) defining values for one or more bits in each of the first and second bit strings as additional pivot bits, the additional pivot bits identifying a type and a position of the code violation;
    (c2) preserving values for bits not included in the given bit sequence corresponding to the code violation; and
    (c3) assigning values, as necessary, for one or more bits of the given bit sequence; and
  d) inserting the first and second nibbles adjacent to corresponding pivot bits to form the 24/25 (0,9) codeword.

11. The method of encoding as recited in claim 10, further comprising the steps of:
  (d) setting the inserted pivot bit to a first value when at least one of the first and second strings contains a code violation; and
  (e) setting the inserted pivot bit to a second value if no code violation exists in the first and second bit strings, the codeword formed by the first and second bit strings and the inserted pivot bit set to the second value therebetween.

12. The method of encoding as recited in claim 11, wherein each code violation is one of a set of code violations, the set of code violations including an end code violation having the given bit sequence corresponding to a first number of consecutive bit values occurring at one end of one of the first and second bits strings, the one end not adjacent to the inserted pivot bit, and the set of code violations including at least one other code violation having the given bit sequence corresponding to a second number of consecutive bit values within one of the first and the second bit strings.

13. The method of encoding as recited in claim 12, wherein the first number of consecutive bit values of the end code violation corresponds to three consecutive zero values, and the predetermined number of consecutive bit values of each other code violation corresponds to six consecutive zero values, thereby to form the codeword of a 16/17 (0,5) block code.

14. A method of decoding a 24/25 (0,9) codeword to provide a dataword having first, second, and third bytes, the method comprising the steps of:
  a) identifying a set of pivot bits within the 24/25 (0,9) codeword;
  b) dividing the 24/25 (0,9) codeword into first and second nibbles and a 16/17 (0,5) codeword based on the set of pivot bits, the 16/17 (0,5) codeword including a set of pivot bits and a set of preserved bits, and the first and second nibbles being the third byte;
  c) determining, from the set of pivot bits, whether the first and second bytes include a code violation, the set of pivot bits identifying a type and position of any code violation, each code violation corresponding to a given bit sequence within the sequence of first and second bytes;

d) forming the first and second bytes from the preserved bits and the given bit sequence of each code violation in accordance with the set of pivot bits.

15. The method of decoding as recited in claim 14, wherein the 24/25 (0,9) codeword is formed by the steps of:

(a) forming the first and second bytes as a sequence having first and second bit strings with a pivot bit inserted therebetween;

(b) dividing the third byte into first and second nibbles;

(c) determining whether each of the first and second bit strings contains at least one code violation in accordance with a 16/17 (0,5) code construction, each code violation corresponding to a given bit sequence; and (d) correcting, as necessary, any code violation in the first and second bit strings by:

(d1) defining values for one or more bits in each of the first and second bit strings as additional pivot bits, the additional pivot bits identifying a type and a position of the code violation and the additional pivot bits and the inserted pivot bit forming the set of pivot bits;

(d2) preserving values for bits not included in the given bit sequence corresponding to the code violation; and (d3) assigning values, as necessary, for one or more bits of the given bit sequence to form the 16/17 (0,5) codeword; and (e) inserting the first and second nibbles of the third byte adjacent to the additional pivot bits of the first and second bit strings in the 16/17 (0,5) codeword, respectively, to produce the 24/25 (0,9) codeword.

16. An integrated circuit including an encoding apparatus for providing a 24/25 (0,9) codeword from three bytes of binary data, the encoding apparatus comprising:

a storage circuit, coupled to an input stream to receive the three bytes, adapted to store the first and second bytes as first and second bit strings and the third byte as first and second nibbles;

a processor, coupled to the storage circuit, adapted to determine in accordance with a 16/17 (0,5) code construction whether each of the first and second bit strings contains at least one code violation, each code violation corresponding to a given bit sequence, the processor identifying a type and a position of the code violation;

an encoder circuit, coupled to the storage circuit, adapted to insert a pivot bit between the first and second bit strings and encode the first and second bit strings with the pivot bit inserted therebetween into a 16/17 (0,5) codeword based on the type and the position of each code violation identified by the processor, wherein the encoder circuit encodes by correcting, as necessary, any code violation in the first and second bit strings by 1) setting the inserted pivot bit to a first value, 2) defining values for a bit in each of the first and second bit strings as additional pivot bits, the additional pivot bits identifying the type and the position of each code violation, 3) preserving values for bits not included in the given bit sequence corresponding to the code violation, and 4) assigning values, as necessary, for one or more bits of the given bit sequence; and a word interleaver adapted to insert the first and second nibbles of the third byte adjacent to the additional pivot bits of the first and second bit strings in the 16/17 (0,5) codeword, respectively, to produce the 24/25 (0,9) codeword.

17. The invention as recited in claim 16, wherein, when the processor determines no code violation exists, the encoder circuit sets the inserted pivot bit to a second value and the word interleaver provides the 24/25 (0,9) codeword as the first and second bit strings with the inserted pivot bit therebetween set to the second value and the first and second nibbles inserted adjacent to the bit positions of the first and second bit strings corresponding to the additional pivot bits.

18. An integrated circuit including a decoding apparatus for decoding a 24/25 (0,9) codeword to provide first, second and third bytes representing binary data, the decoding apparatus comprising:

a word de-interleaver adapted to divide the 24/25 (0,9) codeword into first and second nibbles and a 16/17 (0,5) codeword based on a set of pivot bits of the 24/25 (0,9) codeword, the first and second nibbles forming the third byte;

a storage circuit, coupled to receive the 16/17 (0,5) codeword, adapted to store the 16/17 (0,5) codeword as N symbols;

a processor, coupled to the storage circuit, adapted to provide the preserved bits from the N symbols of the 16/17 (0,5) codeword based on the set of pivot bits and determines, from the set of pivot bits, whether the first and second bytes include a code violation, the set of pivot bits identifying a type and a position of any code violation in the first and second bytes, each code violation corresponding to a given bit sequence within the first and second bytes; and a decoder circuit adapted to form the first and second bytes from the preserved bits and the given bit sequence of each code violation in accordance with the set of pivot bits, wherein the decoder circuit decodes by reconstructing, as necessary, any code violation in the first and second bytes as the given bit sequence having the type and at the position as defined by the set of pivot bits, and by assigning the preserved bits to respective locations in the first and second bytes in accordance with the set of pivot bits.

* * * * *